United States Patent [19]

Gendler et al.

[11] 4,439,280
[45] Mar. 27, 1984

[54] PHENOTHIAZINE LEUCODYES FOR ELECTROCHROMIC RECORDING

[75] Inventors: Paul L. Gendler; Robert J. Twieg, both of San Jose, Calif.

[73] Assignee: International Business Machines Corporation, Armonk, N.Y.

[21] Appl. No.: 426,478

[22] Filed: Sep. 29, 1982

[51] Int. Cl.³ .......................... B21H 1/20; B41C 3/08
[52] U.S. Cl. ......................................... 204/2; 204/15
[58] Field of Search ..................................... 204/2, 15

[56] References Cited

U.S. PATENT DOCUMENTS

| | | | |
|---|---|---|---|
| 4,211,616 | 7/1980 | Sambucetti | 204/2 |
| 4,309,255 | 1/1982 | Gendler et al. | 204/2 |
| 4,374,001 | 2/1983 | Bernier | 204/2 |

Primary Examiner—John F. Niebling
Attorney, Agent, or Firm—Joseph G. Walsh

[57] ABSTRACT

An electrochromic recording substrate comprising bromide ions and a leucodye having the structure

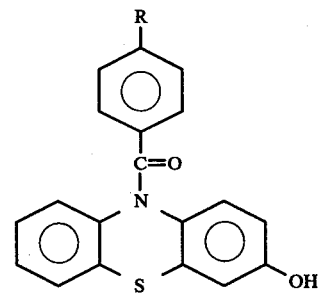

wherein R is lower alkyl, lower alkoxy, lower thioalkyl, lower dialkylamino, or diarylamino.

8 Claims, No Drawings

PHENOTHIAZINE LEUCODYES FOR ELECTROCHROMIC RECORDING

DESCRIPTION

1. Technical Field

The present application is concerned with electrochromic recording. In particular, it is concerned with certain leucodyes for use in electrochromic recording systems.

2. Background Art

Electrochromic recording per se is well known in the art. It is, for example, thoroughly discussed in U.S. Pat. No. 4,211,611 where operations of typical electrochromic systems are explained. It is also discussed, for example, in U.S. Pat. No. 4,309,255 where the use of certain leucomethylene blue dyes is disclosed.

No prior art of which we are aware, however, discloses the use of the compounds of the present invention in electrochromic recording.

DISCLOSURE OF THE INVENTION

According to the present invention, an electrochromic recording system is provided by incorporating into an electrochromic recording substrate (such as paper) bromide ions and the leuco form of a red dye having the structure

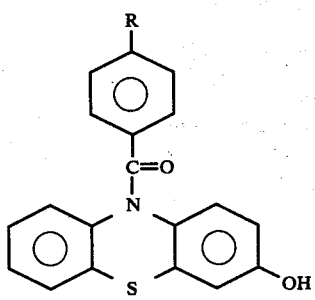

wherein R is lower alkyl, lower alkoxy, lower thioalkyl, lower dialkylamino, or diarylamino.

Although in the past many leucodyes have been found that are very active electrochemically, virtually all of them suffer from undesirable ambient oxidation on the substrate, thereby producing very detrimental background coloration. The ideal dye for use in electrochromic recording must be stable in the colorless form under ambient conditions and, on the other hand, be capable of fast oxidation to the colored form, for example, upon exposure to bromine during the printing operation. The red leucodyes of the present invention meet this requirement.

For use in an electrochromic recording process, a recording substrate such as paper is treated with one of the dyes of the present invention. The typical substrate, of course, is paper. In general, a standard 8½×11 inch page of paper of ordinary thickness would be treated with approximately 10 mg of one of the leucodyes of the present invention. The figure 10 mg is in most cases close to a minimum figure and in general from 20 to 30 mg would usually be more preferable. The substrate, such as paper, is also treated to provide it with bromide ions. During the printing operation the bromide ions are converted to bromine which oxidizes the leucodyes to produce color.

The dyes of the present invention may be used alone or they may be mixed with each other. Alternatively, one or more of the dyes of the present invention may be mixed with other leucodyes so that additive combinations of colors may be obtained during the printing operation.

Preferred compounds of the present invention include, for example, 3-hydroxy-10-(4-methoxybenzoyl)-10H-phenothiazine, 3-hydroxy-10-(4-ethoxybenzoyl)-10H-phenothiazine, 3-hydroxy-10-(4-t-butylbenzoyl)-10H-phenothiazine, 3-hydroxy-10-(4-diethylaminobenzoyl)-10H-phenothiazine and 3-hydroxy-10-(4-diphenylaminobenzoyl)-10H-phenothiazine.

The following procedures are given as preferred methods of synthesizing and using the preferred materials of the present invention. By analogous procedures, the other compounds of the present invention may also be prepared and used.

EXAMPLES

To a 500 ml three-neck round-bottom flask fitted with a stirbar, addition funnel and an argon inlet were added 3-hydroxyphenothiazine (7.51 g, 34.9 mMol, 100 mol%), and methylene chloride (262 ml). The resulting cooled (ice bath) suspension was stirred as triethylamine (5.29 g-7.29 ml, 52.4 mMol 150 mol%), and 4-dimethylaminopyridine (175 mg, 1.4 mMol, 4 mol%) were added. A solution of benzoyl chloride (5.4 g-4.46 ml, 38.4 mMol) in methylene chloride (35 ml) was then added rapidily (ca. 10 min) and the reaction allowed to stir at room temperature for a few hours. After this time, a saturated bicarbonate solution (175 ml) was added and the mixture stirred for an additional hour. The layers were separated and the organic layer dried (MgSO4) and evaporated to give 11.12 g (99.8%) crude product. TLC (25% EtOAc/Hexane) 0.43. The crude product was triturated with hot toluene (10 ml/g) cooled, filtered and washed with toluene (2x), and hexane (1x) to give pure product. 7.14 g (64.1%) mp 177°–178° d. NMR (CDCL$_3$/acetone-d6 3/1 δ: 8.13(d,d,J=2,8), 8.13(m), 2H total; 7.56(m,3H); 7.03 (s,broad,1H); 6.98-6.57 (m,7H). The signal at 7.03 is lost on the addition of D20. m/e: 319;214;186;154;105;77.

To a 100 ml round-bottom three-neck flask fitted with a stirbar and a short path distilling head were added 3-benzoyloxy-10H-phenothiazine (3.19 g, 10 mMol, 100 mol%), and 4-methoxybenzoyl chloride (17.06 g 100 mMOl, 1000 mol%). The mixture was heated in an oil bath at 120° for about ½ hour when the pressure was lowered to 1 mm and the excess 4-methoxybenzoyl chloride distilled. The residue was partitioned between EtOAc/saturated bicarbonate, and washed with bicarbonate until all the 4-methoxybenzoic acid was removed. The yield is essentially quantitative. TLC(25% EtOAc/hexane 0.38) m/e: 453;348;319;286;213; 135;105;77. NMR(CDCl3)δ: 8.13(d,d,J=2,8), 8.13(m),2H total; 7.40(m,9H); 7.07(m,3H); 6.70(d,J=8,2H); 3.73(s,3H).

To 250 ml flask fitted with a stirbar were added 3-benzoyloxy-10-(4-methoxybenzoyl)-10H-phenothiazine (3.636 g, 8.026 mMol, 100 mol%), and tetrahydrofuran (130 ml). To the resulting solution was added at once a solution of 50% sodium hydroxide (1.28 g, 16 mMol, 200 mol%) in methanol (30 ml). The reaction is exceedingly fast; the starting material is gone by the time a TLC can be developed. The reaction was quenched after several minutes by pouring into a separatory funnel containing 100 ml each of water and EtOAc. The organic layer was washed with water (2x), dried (MgSO4) and evaporated to give 3.47 g crude product. Purification is effected by triturating the crude product with a hot acetone/toluene mixture, filtering and washing the precipitate with toluene and then hexane 1.85 g(66.1%). mp 235°-8° TLC (25% EtOAc/hexane) 0.11. NMR (DMSO-d6, external TMS)δ:9.80(s,1H); 7.54(m,2H); 7.27(m,5H); 6.95(d,J=2.5,1H); 6.85(d,J=9,2H); 6.64(d,d,J=2.5, 8.5,1H); 3.78(s,3H). The signal at 9.80 is lost on addition of D20.

A typical formulation for printing is as follows: a sheet of paper is coated with 3 coats of an aqueous solution containing potassium bromide (20%), ascorbic acid (0.1%), and malonic acid (0.1%) followed by one coat of an acetone solution (1%) of any of the compounds of the present application.

We claim:

1. A substrate for electrochromic recording comprising bromide ions and characterized by also comprising a leucodye having the structure

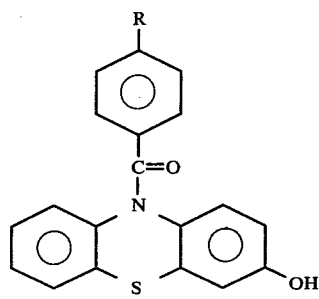

wherein R is lower alkyl, lower alkoxy, lower thioalkyl, lower dialkylamino, or diarylamino.

2. A substrate as claimed in claim 1 wherein the substrate is paper.

3. A substrate as claimed in claim 1 which contains approximately 10 mg of leucodye material per standard page.

4. A substrate as claimed in claim 1 wherein the leucodye is 3-hydroxy-10-(4-methoxybenzoyl)-10H-phenothiazine.

5. A substrate as claimed in claim 1 wherein the leucodye is 3-hydroxy-10-(4-ethoxybenzoyl)-10H-phenothiazine.

6. A substrate as claimed in claim 1 wherein the leucodye is 3-hydroxy-10-(4-t-butylbenzoyl)-10H-phenothiazine.

7. A substrate as claimed in claim 1 wherein the leucodye is 3-hydroxy-10-(4-diethylaminobenzoyl)-10H-phenothiazine.

8. A substrate as claimed in claim 1 wherein the leucodye is 3-hydroxy-10-(4-diphenylaminobenzoyl)-10H-phenothiazine.

* * * * *